United States Patent [19]

Davidson

[11] 4,383,331
[45] May 10, 1983

[54] METHOD AND MEANS OF PREVENTING OSCILLATIONS IN A SAME-FREQUENCY REPEATER

[75] Inventor: Allen L. Davidson, Crystal Lake, Ill.

[73] Assignee: Motorola, Inc., Schaumburg, Ill.

[21] Appl. No.: 279,875

[22] Filed: Jul. 2, 1981

[51] Int. Cl.³ .............................................. H04B 7/14
[52] U.S. Cl. .................................... 455/24; 455/22
[58] Field of Search ..................... 455/20, 24, 22; 179/170 A, 170 F, 170.4

[56] References Cited

U.S. PATENT DOCUMENTS 3,696,429 10/1972 Tressa .................................. 455/24
4,317,217 2/1982 Davidson et al. ................... 455/24

FOREIGN PATENT DOCUMENTS 55-133148 10/1980 Japan .................................. 455/24

*Primary Examiner*—Jin F. Ng
*Attorney, Agent, or Firm*—Donald B. Southard; Edward M. Roney; James W. Gillman

[57] ABSTRACT

A same-frequency repeater used in a system that has at least one other same-frequency repeater is protected against oscillation resulting from feedback of signals broadcast by the same-frequency repeater, either directly or after reception and rebroadcast by another same-frequency repeater. A tag is added to the signal to be broadcast from the first SFR, and one tag detection and canceling system is added to the first SFR for each SFR, in the system. Each tag detector senses the presence of tagged signal received by the first SFR and adjusts amplitude and phase of an appropriately delayed signal that is fed back to cancel the signal containing tag.

6 Claims, 2 Drawing Figures

METHOD AND MEANS OF PREVENTING OSCILLATIONS IN A SAME-FREQUENCY REPEATER

BACKGROUND OF THE INVENTION

This invention relates to same-frequency repeaters. In particular, it is a method and means of eliminating oscillations that would otherwise result from positive feedback of signals.

A repeater is a combination transmitter and receiver that is used to extend the effective range of a transmitter by receiving its signal and rebroadcasting that signal at an amplified level. Broadcast coverage may thus be extended to greater distances than could be served by the original transmitter, and a repeater can be used to fill holes in a pattern of coverage from a transmitter as a result of shielding by natural obstacles and the like. Repeaters have long been used with frequency offset. In such a system, a repeater receives the broadcast signal from a transmitter at a first frequency and regenerates the signal for rebroadcast at a higher power level and at a different frequency. The change in frequencies is very effective in isolating the input of a repeater from spillover signals at its output. Frequency isolation also minimizes problems of oscillation that exist when two repeaters are used in a configuration in which one could receive the broadcast from the other. Because the transmitted frequency bands are different from the received frequency bands, the isolation provided by tuning filters is sufficient to prevent oscillation. The price, however, is bandwidth. A frequency-shift repeater requires twice the bandwidth of the transmitter whose signal it is repeating. In order to reduce this use of spectrum, it is desirable to go to the use of a same-frequency repeater. This is a repeater that receives a signal from a transmitter or another repeater and rebroadcasts that signal, amplified in power level, at the same frequency. When a single such repeater is being used, the possibility exists of spillover of the rebroadcast signal to the receiver of the SFR, and it is necessary to take measures to provide sufficient isolation between the rebroadcast signal and the received signal to prevent oscillation in the SFR. This problem is compounded when two or more SFRs are used in such a way that one is capable of receiving the broadcasts of another.

One way of minimizing the amplification of undesired signals in an SFR, whether those undesired signals come from the SFR itself or from a second SFR, is to broadcast a signal from a base station to a repeater that contains no tag, and to tag any signal that is rebroadcast from an SFR. A tag is an electronic identifier added as some form of modulation to a signal that is passing through an SFR to be repeated. The tag provides a means of separating a signal that has once passed through a repeater from a signal that has not. Such a tag is disclosed in U.S. Pat. No. 4,317,217, entitled "Tag Generator for a Single Frequency Repeater," which is assigned to the assignee of the present invention. That application deals only with the cancellation of spillover signals.

SUMMARY OF THE INVENTION

It is an object of the present invention to provide better operation of a same-frequency repeater.

It is a further object of the present invention to minimize oscillations in a same-frequency repeater that are caused by its reception of a repeated version of its own signal.

Other objects will become apparent in the course of a detailed description of the invention.

A same-frequency repeater used in a system that has at least one other same-frequency repeater is protected against oscillation resulting from feedback of signals broadcast by the same-frequency repeater and received on its antenna, either directly or after reception and rebroadcast by another SFR. A tag is added at the RF or IF level in the first SFR, and one tag detector and cancelling system is added to the first SFR for each SFR in the system. Each tag detector senses the presence of tagged signal in the input to the first SFR and controls amplitude and phase of an appropriately delayed signal that is fed back to cancel the signal containing tag.

DETAILED DESCRIPTION OF THE INVENTION

Figure 1:
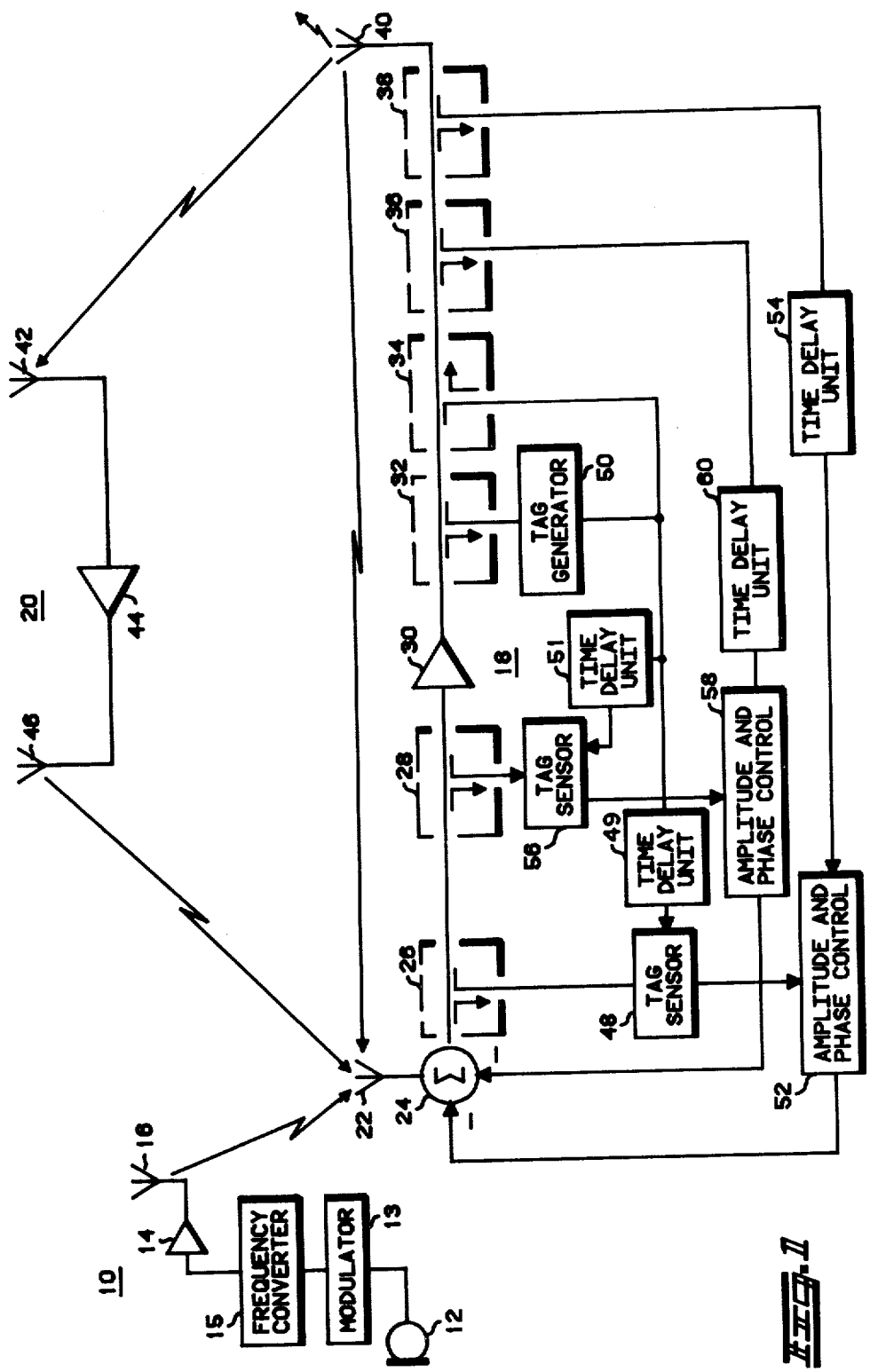
FIG. 1 is an overall block diagram of a system for the practice of the present invention.

FIG. 1 is an overall block diagram of a system including same-frequency repeaters (SFRs), of which one is adapted for the practice of the present invention. In FIG. 1, a base station 10 includes a microphone 12 producing a voice signal that is applied to modulator 13, raised in frequency by frequency converter 15, amplified in amplifier 14 and transmitted from antenna 16. SFRs 18 and 20 are part of a system for rebroadcasting a signal from base station 10, but it is supposed here that SFR 20 is so placed as to receive signals from SFR 18 but not base station 10. SFR 18, on the other hand, is supposed to be able to receive signals both from base station 10 and SFR 20. In addition, as will be seen, SFR 18 receives spillover signal. A spillover signal is a signal transmitted from the transmitting antenna of a repeater and received by the receiving antenna of the same repeater.

SFR 18 includes a receiving antenna 22 that takes a received signal to summer 24. The output of summer 24 is taken through directional couplers 26 and 28 to power amplifier 30, where it is amplified to a power level suitable for rebroadcast at the same frequency. The output of power amplifier 30 is passed successively through directional couplers 32, 34, 36 and 38, and is then coupled to transmitting antenna 40 for rebroadcast.

Passage of a signal through SFR 18 from receiving antenna 20 to transmitting antenna 40 takes a finite time, typically of the order of 100 or 200 microseconds. That time, the time delay in SFR 18, plus the propagation delay from transmitting antenna 40 to receiving antenna 22, will be denoted $t_1$. It is the time delay of any spillover signal from transmitting antenna 40 that is received at receiving antenna 22. It is also part of the time delay of a signal that is received at receiving antenna 42 of SFR 20 to be there amplified in amplifier 44 and rebroadcast on transmitting antenna 46. SFR 20 will also introduce a time delay of the same order as the time delay in SFR 18. The time delay in the signal from SFR 20 will be denoted $t_2$. Thus, we see that, under the assumption stated above, three different signals will be received at receiving antenna 20 of SFR 18. These are, first, the original signal from base station 10, in a time that is taken as a reference. Next, the spillover signal from transmitting antenna 40 of SFR 18 will be received, delayed by time $t_1$. Finally, a signal will be received from transmitting antenna 46, delayed by a time $t_2$. At best, the presence of three such signals at receiving antenna 20 would produce the possibility of interference with the modulated signals contained on the three broadcasts. At worst, the signals will experience time delays in passing from antenna 20 through one or two SFRs and returning that will provide positive feedback and cause oscillation. The most likely result is a combination of the effects described with SFR 18 going into and out of oscillation. The purpose of the present invention is to prevent these effects.

From the standpoint of signals at antenna 22 of SFR 18, signals containing no tag are desired signals, and signals containing tag are undesired. If SFR 18 receives undesired signals, then it will be necessary to derive signals with appropriate time delays, amplitudes and phases to add in summer 24 so as to cancel signals containing tag and leave only the desired tag-free signals. To do this, a tag sensor 48 is coupled to directional coupler 26 to sense the presence of tag in the signal applied to directional coupler 26. Tag sensor 48 is indicated as receiving an input from tag generator 50, delayed by time delay 49. Tag generator 50 is here shown as coupled to the output of amplifier 30 by directional coupler 32, but it should be evident that tag generator could equally as well be an independent oscillator or the like, having no signal input.

The output of tag sensor 48 supplies a control signal to amplitude and phase control unit 52 which has as an input a sample of the output through directional coupler 38 that is delayed by time delay unit 54. The amplitude and phase control of the delayed signal is adjusted in amplitude and phase control unit 52 in response to the amount of tag sensed by tag sensor 48. The controlled amount is fed back to be subtracted at summer 24. The result will be to cancel a tagged signal that has the time delay associated with time delay unit 54. If SFR 20 were not present, the time delay of time delay unit 54 could be set to the order of the propagation time between transmitting antenna 40 and receiving antenna 22 to cancel spillover signal. This function will still be necessary, but it will be insufficient to remove tagged signals if SFR 20 is also producing a tagged signal from SFR 18 with a different time delay. To cancel that tagged signal, tag sensor 56 detects the presence of tag in a signal sampled by directional coupler 28. Tag sensor 56 receives for comparison a signal from tag generator 50, delayed by time delay 51. The output of tag sensor 56 is taken to control amplitude and phase control unit 58 which receives as an input a sample of the output from directional coupler 36 delayed by the time delay of time delay unit 60. This output, adjusted by tag sensor 56 to minimize tag with the time delay of time delay 60, is also applied to be subtracted in summer 24.

The various signal paths and propagation times are summarized in Tables 1 through 4:

TABLE 1

| Signal paths and times in FIG. 1 taking time $t_3$. | |
|---|---|
| Broadcast sensing path | Internal sensing path |
| Tag generator 50 | Tag generator 50 |
| Directional coupler 34 | Time delay 49 |
| Directional coupler 36 | Tag sensor 48 |
| Directional coupler 38 | |
| Transmitting antenna 40 | |
| Receiving antenna 22 | |

TABLE 1-continued

| Signal paths and times in FIG. 1 taking time $t_3$. | |
|---|---|
| Broadcast sensing path | Internal sensing path |
| Summer 24 | |
| Directional coupler 26 | |
| Tag sensor 48 | |

Adjust time delay 49 to make both times equal $t_3$.

TABLE 2

| Signal paths in FIG. 1 taking time $t_4$. | |
|---|---|
| Broadcast sensing path | Internal sensing path |
| Tag generator 50 | Tag generator 50 |
| Directional coupler 34 | Time delay 51 |
| Directional coupler 36 | Tag sensor 56 |
| Directional coupler 38 | |
| Transmitting antenna 40 | |
| Receiving antenna 42 | |
| Amplifier 44 | |
| Transmitting antenna 46 | |
| Receiving antenna 22 | |
| Summer 24 | |
| Directional coupler 26 | |
| Directional coupler 28 | |
| Tag sensor 56 | |

Adjust time delay 51 to make both times equal $t_4$.

TABLE 3

| Signal paths in FIG. 1 taking time $t_5$. | |
|---|---|
| Broadcast canceling path | Internal canceling path |
| Directional coupler 38 | Directional coupler 38 |
| Transmitting antenna 40 | Time delay 54 |
| Receiving antenna 22 | Amplitude and phase control unit 52 |
| Summer 24 | Summer 24 |

Adjust time delay 54 to make both times equal $t_5$.

TABLE 4

| Signal paths in FIG. 1 taking time $t_6$. | |
|---|---|
| Broadcast canceling path | Internal canceling path |
| Directional coupler 36 | Directional coupler 36 |
| Directional coupler 38 | Time delay 60 |
| Transmitting antenna 40 | Amplitude and phase control unit 52 |
| Receiving antenna 42 | Summer 24 |
| Amplifier 44 | |
| Transmitting antenna 46 | |
| Receiving antenna 22 | |
| Summer 24 | |

Adjust time delay 60 to make both times equal $t_6$.

Referring to the Table, it can be seen that there is a sensing path for broadcast signals, both for direct spillover and for signal broadcast through a second repeater. There is a corresponding internal sensing path for each, and a time delay to adjust to make each of the respective internal paths equal the fixed lengths of their corresponding broadcast paths. There is also a canceling path for broadcast signals, both for direct spillover and for signals broadcast spillover through a second repeater. There is a corresponding internal canceling path for each, and a time delay to adjust to make each of the respective internal paths equal the first lengths of their corresponding broadcast paths.

Figure 2:
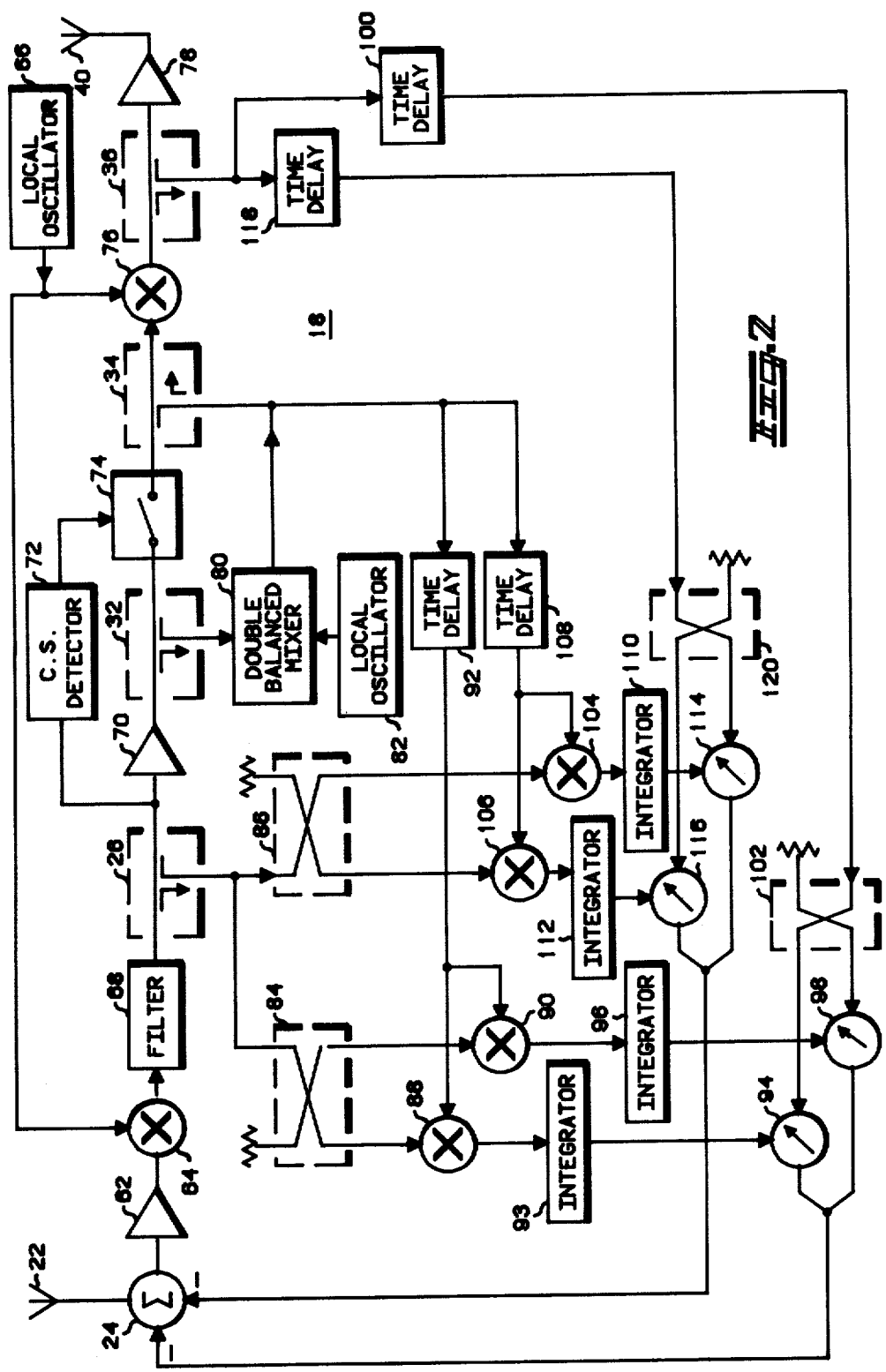
FIG. 2 is a circuit diagram of an SFR including a circuit for the practice of the present invention.

The practice of the invention is made more explicit in FIG. 2, which is a circuit diagram of an SFR 18 of FIG. 1. Elements of FIG. 1 that are repeated in FIG. 2 will be given the same numbers for clarity. In FIG. 2, receiving antenna 22 receives three signals that are coupled to summer 24. One of these signals is a modulated, untagged, undelayed signal from base station 10 of FIG. 1. A second is a signal containing tag $T_1$ and delayed by time $t_1$ from transmitting antenna 40. The third is a signal from SFR 20 of FIG. 1 that contains both tags $T_1$ and $T_2$ and that is delayed by a time delay $t_2$. The output of summer 24 is amplified in RF amplifier 62 and is shown here as being applied to mixer 64 where it is mixed with a signal from local oscillator 66. This circuit configuration assumes that it is desired to detect the cancellation of tagged signals at an intermediate frequency. In the alternative, cancellation may be detected at RF frequencies, in which case mixer 64 and local oscillator 66 will not be used. In any event, the signal, whether RF or IF, is applied to filter 68 which sets the bandwidth of the processed signal. The output of filter 68 is applied to directional coupler 26, which here serves the functions of both directional couplers 26 and 28 of FIG. 1. The through output of directional coupler 26 is applied both to an amplifier 70 and to a coded squelch detector 72 such as a "Private Line" detector. "Private Line" is a registered trademark for a coded squelch system. If the input signal has previously been down-converted to an intermediate frequency, amplifier 70 is an IF amplifier or a string of IF amplifiers. Amplifier 70 may be an RF amplifier if it is desired to carry out all operations of SFR 18 at RF frequencies. It is evident that multiple conversion to lower intermediate frequencies would also not affect the operation of the SFR provided there was an up conversion for each down conversion and that the same oscillator that effected each down conversion was used to effect the corresponding up conversion.

The output of amplifier 70 is taken to directional coupler 32, the through connection of which is taken to switch 74. Coded-squelch detector 72 and switch 74 are indicated in FIG. 2 because it is considered likely that an operator of an SFR would want to limit its use to his paid customers who could provide some form of identification. That function is indicated symbolically here by a coded-squelch detector 72 which is connected to a switch 74 that is held open if an unauthorized subscriber not having the proper code attempts to broadcast through the repeater. The output of switch 74 is taken through directional coupler 34 to mixer 76 where it is mixed with the signal from local oscillator 66 to produce an output signal that is at the same frequency of the input to mixer 64 and is synchronized with it. This up-converted signal is taken through directional coupler 36 to RF amplifier 78, thence to be broadcast from antenna 40. The signal at the output of amplifier 70 should be untagged. This untagged signal is sampled by directional coupler 32 and is mixed in double balanced mixer 80 with a signal from audio oscillator 82. Double balanced mixer 80 produces two side frequencies with a suppressed carrier. Both frequencies may be used as tags, or one may be removed by a filter. The output of double balanced mixer 80 is combined in directional coupler 34 with the output signal from switch 74 to provide a tagged signal whenever switch 74 is closed. When switch 74 is open, indicating either that no signal is being received at antenna 22 or else that the signal being received at antenna 22 does not contain a private-line identifier, then the signal path through directional coupler 32, balanced mixer 80 and directional coupler 34 will produce a tag at a low power level that will be enough for the correlation circuitry to synchronize on. This allows the system to adapt partially in the absence of the signal, when the only input to the receiving antenna 22 is noise. If the circuit contained no more than the elements just described, the signal broadcast from antenna 40 would contain in principle whatever components were contained in the signal received at receiving antenna 22. As indicated earlier, this is stated to be in principle because if the signal received at receiving antenna 22 contains components derived from the broadcast signal at antenna 40 either directly as spillover or indirectly as a signal received and rebroadcast by another SFR, then there is a possibility of oscillation which will hamper operation of SFR 18.

Directional coupler 26 taps a portion of the output of filter 68 that is taken to two quarter-wave hybrids 84 and 86. Hybrid 84 generates an in-phase signal that is taken to mixer 90 and a quadrature signal that is taken to mixer 88. Second inputs to mixers 88 and 90 are obtained by taking the signal from double balanced mixer 80 that contains a tag and applying it to time delay 92. Time delay 92 is set to delay its input an amount sufficient to cause the input to mixers 88 and 90 to have a time delay equal to that of the spillover signal from transmitting antenna 40 that is received at receiving antenna 22. The existence of a difference in phase of these signals generates outputs from mixers 90 and 88 that are proportional to the detected in-phase and quadrature components, respectively. The output of mixer 90 is taken to an integrator 96 which produces a DC output proportional to the amount of in-phase tagged signal with appropriate time delay detected at directional coupler 26. This DC signal is taken to weighter 98. Similarly, an output from mixer 88 indicating the presence of quadrature components is taken to integrator 93 which integrates the difference signal to produce a DC voltage that controls weighter 94. In the meantime, a signal containing injected tag is sampled at directional coupler 36 which serves the functions of both directional couplers 36 and 38 of FIG. 1. Directional coupler 36 of FIG. 2 supplies a signal containing tag to time-delay unit 100. There it is delayed appropriately and applied to quarter-wave hybrid 102 to produce an in-phase component that is taken to weighter 98 and a quadrature component that is taken to weighter 94. Settings of weighters 98 and 94, as determined by the signals from integrators 96 and 92, respectively, determine the amounts of in-phase and quadrature components that are taken as an input to summer 24 to be subtracted from the incoming signal.

As stated earlier, if there were only one SFR in use, it would be necessary only to cancel spillover signal from it. When a second SFR is in use, it will also be necessary to cancel signal that has been received by the second SFR from the first and rebroadcast to the first. It is assumed here that the second SFR, SFR 20 of FIG. 1, will also introduce a tag. This second tag may be at the same frequency as the tag of SFR 18, or it may be at a different frequency. In either case, a signal from SFR 20 of FIG. 1 will be received at antenna 22 of FIG. 2 and will appear at directional coupler 26 containing two tags from SFR 18 and possibly one from SFR 20. The sampled signal at directional coupler 26 is taken to hybrid 86 which produces an in-phase component at correlator 106 and a quadrature component at correlator 104. The tag from mixer 80 is delayed in time delay 108. The sum and difference frequencies from correlators 104 and 106 are applied to integrators 110 and 112, respectively. These produce zero output when the mixed signals are in quadrature or when one is zero, but produce DC outputs when the signals are not in phase quadrature. The outputs from integrators 110 and 112 are coupled to weighters 114 and 116, respectively. A signal from directional coupler 36 is applied to time delay 118. The signal at directional coupler 36 contains a tag that has been applied in SFR 18. That signal is delayed in time delay 118 by an appropriate amount $t_2$ and is connected to quadrature hybrid 120 where it generates an in-phase and a quadrature signal. The in-phase signal is applied to weighter 116, and the quadrature signal is applied to weighter 114. The amplitudes of the signals passed by weighters 114 and 116 are adjusted in proportion to the outputs from integrators 110 and 112, respectively, to produce a composite signal that applies negative feedback to reduce the amount of tagged signal at the output of summer 24 that is from SFR 18, delayed to the proper phase. The feedback signal is subtracted at summer 24.

It should be apparent that if other SFRs were to broadcast within range of receiving antenna 22, other tagged signals from SFR 18 that they rebroadcast could be cancelled by applying additional negative-feedback circuits. It would be necessary only to add the additional circuitry and to adjust the added time delays to correspond to the time delay to, from, and in the additional SFR. Referring again to FIG. 1, it should be evident that the operation of SFR 20 would be improved correspondingly if it contained circuits to respond to a tag in its own signal and in the signal from SFR 18 and to apply negative feedback in a similar fashion to subtract out the tagged components.

I claim:

1. A method of minimizing oscillations in a same-frequency repeater comprising the steps of:
   a. inserting an identifying tag in a signal to be transmitted from the same-frequency repeater;
   b. sensing presence of the tag in a summed signal that includes a signal received by the same-frequency repeater;
   c. sampling the signal to be transmitted containing the identifying tag;
   d. delaying the sampled signal for a first predetermined time to produce a first delayed sampled signal;
   e. varying amplitude and phase of the first delayed sampled signal by a controlled amount;
   f. delaying the sampled signal for a second predetermined time to produce a second delayed sampled signal;
   g. varying amplitude and phase of the second delayed sampled signal by a second controlled amount;
   h. adding the first delayed sampled signal with varied amplitude and phase and the second delayed sampled signal with varied amplitude and phase to the signal received by the same-frequency repeater to produce the summed signal; and
   i. controlling the amount of variation of the amplitudes and phases of the first and second delayed sampled signals to produce a minimum amount of tag in the summed signal, whereby signal containing the tag is minimized in the same-frequency repeater and hence oscillations are minimized.

2. The method of claim 1 wherein the first predetermined time of delay is approximately equal to the sum of the propagation time of a signal through the same-frequency repeater and the propagation time of a signal from transmission by the same-frequency repeater to reception by the same-frequency repeater, and wherein the predetermined time of the second delay is approximately equal to the sum of the propagation time through the same-frequency repeater, twice the propagation time to a second same-frequency repeater, and the propagation time through the second same-frequency repeater.

3. The method of claim 1 wherein the identifying tag is a sinusoidal signal at a fixed frequency.

4. An apparatus for minimizing oscillations in a same-frequency repeater comprising:
   a. means for inserting an identifying tag in a signal to be transmitted from the same-frequency repeater;
   b. means for sensing presence of the tag in a summed signal that includes a signal received by the same-frequency repeater;
   c. means for sampling the signal to be transmitted containing the identifying tag;
   d. means for delaying the sampled signal for a first predetermined time;
   e. means for varying amplitude and phase of the first delayed sampled signal by a controlled amount;
   f. means for delaying the sampled signal for a second predetermined time to produce a second delayed sampled signal;
   g. means for varying amplitude and phase of the second delayed sampled signal by a second controlled amount;
   h. means for adding the first and second delayed sampled signals with varied amplitude and phase to the signal received by the same-frequency repeater to produce the summed signal; and
   i. means for controlling the amount of variation of the amplitudes and phases of the first and second delayed sampled signals to produce a minimum amount of tag in the summed signal, whereby signal containing the tag is minimized in the same-frequency repeater and hence oscillations are minimized.

5. In a same-frequency repeater having a receiving antenna, an amplifier, and a transmitting antenna, a circuit for minimizing oscillations caused by receiving at the receiving antenna a signal transmitted from the transmitting antenna, the circuit comprising:
   a. a summer connected to the receiving antenna and receiving as an input a signal from the receiving antenna;
   b. a first sampler connected to the summer and to the amplifier and receiving as an input an output of the summer that is coupled to the amplifier;
   c. a first tag sensor connected to the first sampler to detect presence of a tag;
   d. a tag generator connected to an output of the amplifier to add a tag to the output of the amplifier;
   e. a second sampler connected to the output of the amplifier and to the transmitting antenna to sample tagged output and to couple tagged output to the transmitting antenna;
   f. a first time delay connected to the second sampler to delay the sampled signal;
   g. a first amplitude-and-phase-control unit connected to the first time delay, the first tag sensor and the summer to control amplitude and phase of the delayed sampled signal in response to a signal from the first tag sensor, the amplitude-and-phase-control unit providing a controlled delayed sampled signal as an input to the summer;
   h. a second tag sensor connected to the first sampler to detect the presence of a tag;
   i. a second time delay connected to the second sampler to delay the sampled signal; and j. a second amplitude-and-phase control unit connected to the second time delay, the second tag sensor, and the summer to control amplitude and phase of the second delayed sampled signal in response to a signal from the second tag sensor, the second amplitude-and-phase-control unit providing a second controlled delayed sampled signal as an input to the summer.

6. The circuit of claim 5 wherein the first time delay is for a time approximately equal to the time taken by a signal in propagating through the amplifier to the transmitting antenna plus the time taken to propagate from the transmitting antenna to the receiving antenna, and the second time delay is for a time approximately equal to the time taken by a signal in propagating through the amplifier to the transmitting antenna plus twice the time required for a signal to propagate from the same-frequency repeater to a second same-frequency repeater plus the time required for a signal to propagate through the second same-frequency repeater.

* * * * *